(12) United States Patent
Morales (10) Patent No.: US 7,961,342 B2
(45) Date of Patent: Jun. 14, 2011

(54) AUTOMATED PRINT-RELATED WORKFLOW

(75) Inventor: Javier A Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 755 days.

(21) Appl. No.: 12/040,171

(22) Filed: Feb. 29, 2008

(65) Prior Publication Data

US 2009/0219563 A1    Sep. 3, 2009

(51) Int. Cl.
*G06K 15/00* (2006.01)
*G06F 3/12* (2006.01)

(52) U.S. Cl. .................... 358/1.15; 358/1.18

(58) Field of Classification Search ............... 358/1.15, 358/1.18, 1.12, 1.13, 1.16, 471, 444, 404, 358/448, 443
See application file for complete search history.

(56) References Cited

U.S. PATENT DOCUMENTS

| 6,462,756 | B1 | 10/2002 | Hansen et al. | |
|---|---|---|---|---|
| 7,092,963 | B2 | 8/2006 | Ryan et al. | |
| 7,242,302 | B2 | 7/2007 | Rai et al. | |
| 2003/0169646 | A1* | 9/2003 | Nagata et al. | 369/30.05 |
| 2006/0126119 | A1 | 6/2006 | Morales et al. | |
| 2006/0271927 | A1 | 11/2006 | Morales et al. | |
| 2007/0201045 | A1 | 8/2007 | Morales et al. | |
| 2007/0236725 | A1* | 10/2007 | Harmon et al. | 358/1.15 |

* cited by examiner

*Primary Examiner* — Jerome Grant, II
(74) *Attorney, Agent, or Firm* — Kermit D. Lopez; Luis M. Ortiz; Ortiz & Lopez, PLLC (57) ABSTRACT

An automated print prepress workflow, including a memory; a processor communicating with the memory; and a job ticket stored in the memory, is provided. The job ticket includes a plurality of print job related parameters and a set of print job related information. The workflow further includes a conditional branching arrangement defining a plurality of print job prepress development paths, each one of these plurality of paths including one or more print job prepress development operations. Prepress development of the print job may include automatically branching to one of the plurality of print job prepress development paths responsive to the processor reading one or both of the (1) the one or more of the plurality of print job related parameters and (2) at least part of the print job related information set. One or more of the print job prepress development operations may be automatically adaptively processed.

23 Claims, 6 Drawing Sheets

POSITION RELATIVE TO:
PDF TRIM BOX ▼

HORIZONTAL: 0.25" | FROM BINDING EDGE ▼     VERTICAL: 0.00" | CENTER ▼

AUTOMATED PRINT-RELATED WORKFLOW

BACKGROUND AND SUMMARY

The disclosed embodiments relate generally to print-related workflows and, more particularly, to a prepress workflow automation architecture with enhancements that enable full automation of heterogeneous print-related work.

Workflow programs, such as Xerox's FreeFlow™ Process Manager can be used to automate document preparation and eliminates steps from the production process. Associated software can be used to handle a wide range of demanding and complex print jobs. As is known, workflow programs can be used to lower the cost of performing prepress operations. Prepress can include a wide variety of operations ranging from preparing camera ready materials for printing to page layout, and proofreading. By reducing the amount of manual labor associated with performing prepress operation, workflows can improve the efficiency of the entire print production process.

A number of print shop workflow products on the market aim to deliver automation by taking current work processes and making them more efficient. In one known approach, a prepress operator reviews each job, specifies processing parameters and submits the job for automated execution. It has been observed that fully automated production is often reserved for only the most homogeneous work, and that automated print related production is the exception rather than the rule. Hence, the level of true automation that a print shop can achieve may often be based on the homogeneity of the encountered workload (e.g., a book publisher can achieve higher automation levels than a general color graphics print shop because they have a more homogeneous workload). While it is understood that automation techniques can, for example, allow a person in a typical prepress department to handle 50-60 jobs per day (as opposed to the more typical 25-30), this type of automation is not necessarily suited for permitting an operator in a prepress department to handle 250-300 jobs per day. In order to handle such high volume of work (with a fairly heterogeneous workload), operator intervention would need to be the exception rather than the rule.

Figure 1:
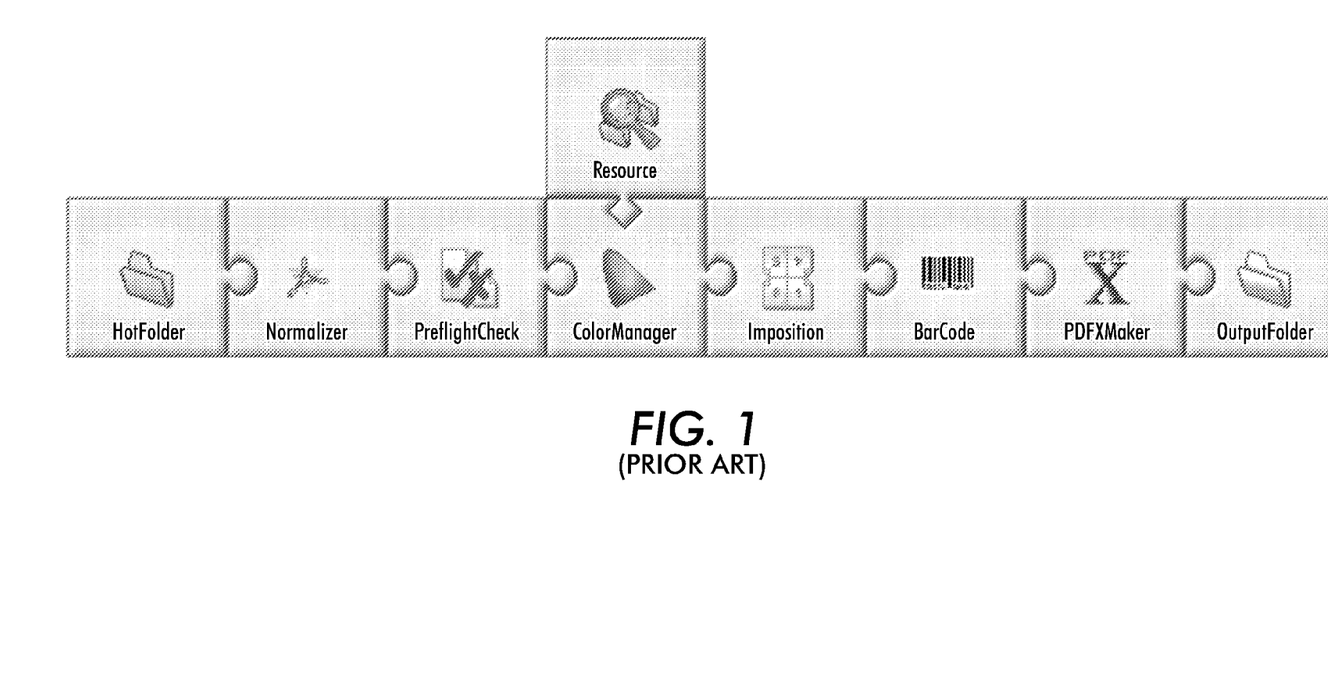
FIG. 1 is a schematic, block diagrammatic representation of a prior art workflow.

Prepress automation systems may provide a mechanism for the end user to sequence prepress operations together in a workflow that can then be automatically executed against a given job. These workflows, as implemented in products such as AC&C HSH's PuzzleFlow or EFI's OneFlow® are very linear and are typically programmed manually for every job. Referring to FIG. 1, an example of a workflow from PuzzleFlow is shown. Note that, with the implementation of FIG. 1, any deviation from the mainline workflow path involves resource consumption or archiving of intermediary files. Aside from that, all workflows of the type shown in FIG. 1 are believed to follow a straight-line path through production. As such, these prepress automation systems have limited ability to provide true "lights out" automation. While an operator might become highly efficient using these tools, corresponding systems do not appear to provide automated production in which operator intervention is the exception rather than the rule.

Prepress automation systems may use certain features, such as "conditional branching," to partially automate prepress workflows. Conditional Branching represents a fundamental shift in the way work gets done in prepress. Instead of enabling a workflow in which the prepress operator touches every job, Conditional Branching contributes to a workflow in which the automation system handles most jobs without operator intervention and the prepress operator touches jobs only by exception. Examples of Conditional Branching arrangements have been implemented by way of Gradual's powerSWITCH, Enfocus PitStop Automate and Automate's full-featured sibling ArtWork System's OdyStar. It will be appreciated by those skilled in the art that use of Conditional Branching (or automated routing) alone cannot provide a fully automated prepress workflow.

"Adaptive Processing" is a workflow related feature permitting at least one prepress workflow operation to be adaptively modified during execution based on evaluation of certain pre-stored information. Referring specifically to U.S. Patent Application Publication No. 20060126119 (published on Jun. 10, 2006), the pertinent portions of which are incorporated herein by reference, a system (with controller and memory) can be programmed to automatically select media based on associated signature dimensions. As part of evaluating media, the controller can gather a list of media currently available for a print engine and automatically determine which subset of media should be used to print the print job. Another example of adaptive processing, particularly well suited for use in the area of imposition lay out, is disclosed in U.S. Patent Application Publication No. 20070201045 (published on Aug. 28, 2007), the pertinent portions of which are incorporated herein by reference.

A "job ticket" may be used to drive several aspects of a prepress workflow. As is known, job submission includes the receipt of a job by the print shop and the entering of the job into the print shop production system or workflow. Typically the instructions from the customer are provided in a format known as a job ticket. It is common for such ticket to be provided in electronic form. In many instances, the relationship between an input job ticket and a corresponding internal job representation is mostly fixed. Even a few know systems that allow sophisticated customization of job tickets, such as PressSense and Omnium, take a limited view of the information used to populate the internal job ticket. Omnium, for example, appears to work with just JDF job tickets and will not look elsewhere in an associated system for information that needs to be reconciled with the JDF input. While one available system, namely powerSWITCH, does permit the harvesting of information from a multiple sources (via the PDFSpy, JDFSpy and XMLSpy process nodes), it does not appear to provide any mechanism for reconciling such harvested information into a single job ticket.

In one aspect of the disclosed embodiments there is disclosed a system for developing a print job. The system includes: a processor; a print job workflow, communicating with the processor, the print job workflow defining a plurality of print job prepress development operations to be performed with respect to the print job, the plurality of print job prepress development operations being arranged in a print job prepress development path, wherein at least one of the print job prepress development operations is operatively associated with a parameter and programmed to perform adaptive processing with the parameter; a memory for storing a job ticket, the job ticket including a set of print job related information, said memory comprising one or more programming instructions that, when executed, instruct the processor to: (1) execute each prepress development operation in the print job prepress development path, (2) pursuant to said executing each prepress development operation, determining whether the print job prepress development operation to be executed comprises the at least one of the print job prepress development operations, (3) if the print job prepress development operation to be executed comprises the at least one of the print job prepress development operations, then adaptively using the parameter, along with a subset of the set of print job related information, to perform adaptive processing with respect to the at least one or the print job prepress development operations, and (4) if the print job prepress development operation to be executed does not comprise the at least one of the print job prepress development operations, then execute the print job prepress development operation to be executed without performing any adaptive processing.

In accordance with another aspect of the disclosed embodiments there is disclosed an automated print prepress workflow for developing a print job for execution in a printing system at a selected runtime. The automated print prepress workflow includes: memory; a processor communicating with the memory; a job ticket stored in the memory, the job ticket including a plurality of print job related parameters and a set of print job related information; a conditional branching arrangement communicating with the processor, the conditional branching arrangement defining a plurality of print job prepress development paths, each one of the plurality of print job prepress development paths including one or more print job prepress development operations; wherein prepress development of the print job includes automatically branching to one of the plurality of print job prepress development paths, responsive to the processor reading one or both of the (1) the one or more of the plurality of print job related parameters and (2) at least part of the print job related information set, to execute each one of the one or more print job prepress development operations; and wherein, during execution of at least one of the one or more print job prepress development operations, said at least one of the one or more print job prepress development operations is automatically adaptively processed.

In yet another aspect of the disclosed embodiments there is disclosed a method for developing a print job. The method includes: storing a job ticket in memory, the job ticket including a set of print job related information; instructing or causing a processor to perform the following: (1) execute each prepress development operation in a plurality of print job prepress development operations, the plurality of print job prepress development operations being arranged in a print job prepress development path, wherein at least one of the print job prepress development operations is operatively associated with a parameter and programmed to perform adaptive processing with the parameter, (2) pursuant to said executing of each prepress development operation, determining whether the print job prepress development operation to be executed comprises the at least one of the print job prepress development operations, (3) if the print job prepress development operation to be executed comprises the at least one of the print job prepress development operations, then adaptively using the parameter, along with a subset of the set of print job related information, to perform adaptive processing with respect to the at least one of the print job prepress development operations, and (4) if the print job prepress development operation to be executed does not comprise the at least one of the print job prepress development operations, then execute the print job prepress development operation to be executed without performing any adaptive processing.

In another aspect of the disclosed embodiments there is disclosed a method for developing a print job for execution in a printing system at a selected runtime. The method includes: storing a job ticket in memory, the job ticket including a plurality of print job related parameters and a set of print job related information; automatically branching to one of a plurality of print job prepress development paths, each one of the plurality of print job prepress development paths including one or more print job prepress development operations, said automatic branching being responsive to said processor reading one or both of the (1) the one or more of the plurality of print job related parameters and (2) at least part of the print job related information set; executing each one of the one or more print job prepress development operations in the one of the plurality of print job prepress development paths; and pursuant to executing at least one of the one or more print job prepress development operations, automatically adaptively processing the at least one of the one or more print job prepress development operations.

DESCRIPTION OF DISCLOSED EMBODIMENTS

Figure 2:
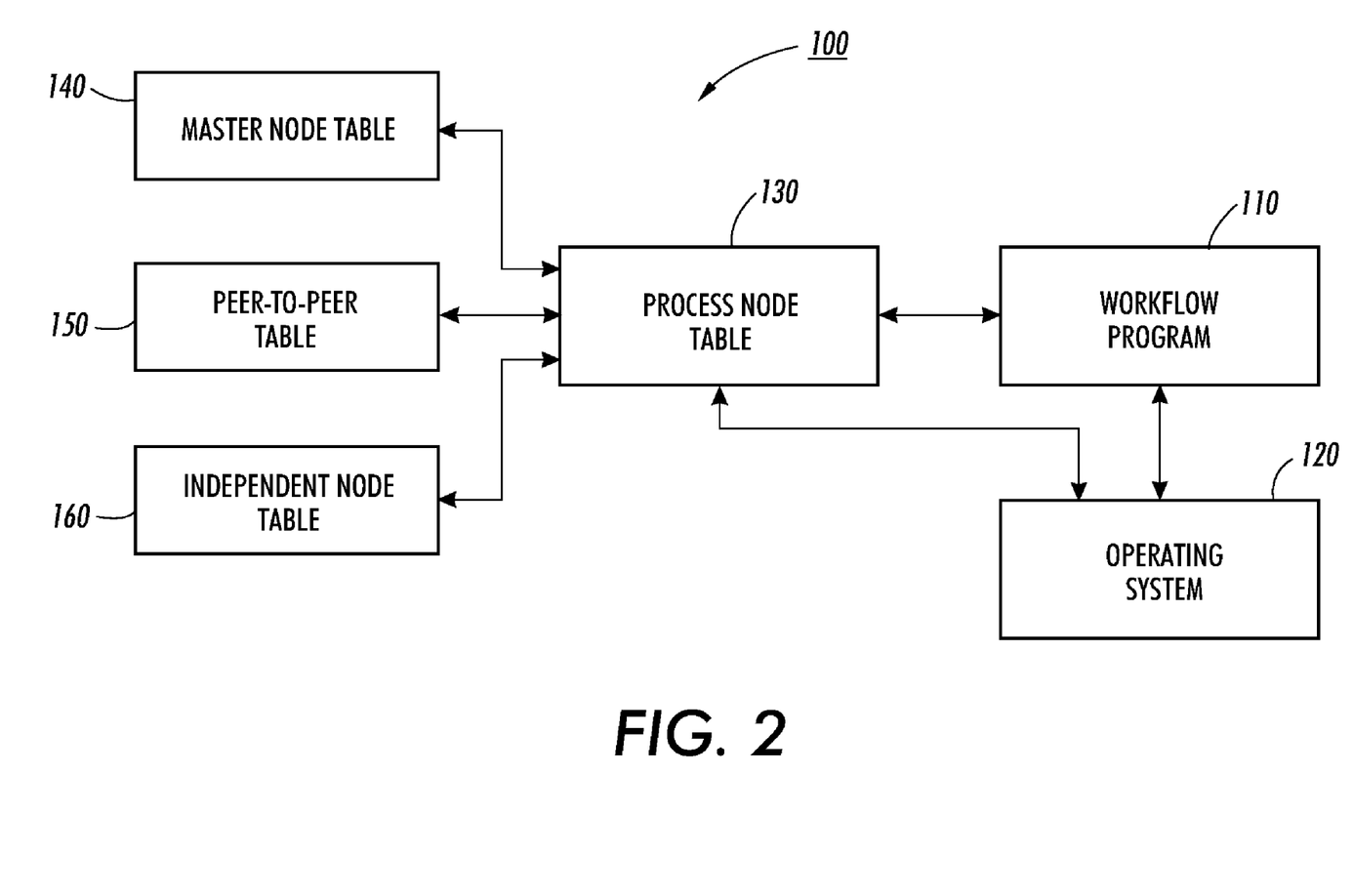
FIG. 2 is a block diagram of an exemplary node management system

The disclosed embodiments may be performed on any suitable document processing related platform employing a computer in conjunction with memory and one or more "resources." A resource may include a process or device that, either by itself or in coordination with one or more other resources, performs one or more document processing related operations relative to an electronic document. A resource may include, among other things, a utility for performing one or more prepress operations (such as imposition) or a finishing related device (for performing one or more finishing operations on at least one set of print media sheets). An example of a printing related platform is shown in U.S. Pat. No. 7,242, 302, the pertinent portions of which are incorporated herein by reference. In particular, an exemplary platform is shown in FIGS. 1 and 2 of the '302 Patent, and described in accompanying text. It can be noted that the disclosed embodiments describe the use of system "nodes," examples of which are shown in FIG. 2 of the '302 Patent and described in further detail below.

The disclosed embodiments relate, in part, to an approach for managing nodes in a process workflow. More particularly, as described in U.S. Patent Application Publication 20060271927 (published on Nov. 30, 2006) [the pertinent portions of which are incorporated herein by reference], a process node manager may be configured to manage associations between nodes based on either a master association or a peer-to-peer association. When a user designates a master association for a process node (e.g., a master node), the process node manager may be configured to propagate any changes or edits to the designated slave/client nodes in response to saving the changes in the master process node. It should be noted that slave/client nodes may not be directly editable. When a user designates a peer-to-peer association for a group of nodes, any changes to a peer within a peer-to-peer association is propagated to the rest of the group in response to the save event.

Referring to FIG. 2, an exemplary node management system is designated with the numeral 100. The system 100 includes a workflow program 110, an operating system 120, and a process node table or node maintenance manager 130. The workflow program 110 may be configured to model and implement workflow for processes such as printing, production lines, or other industrial/business applications. An example of a workflow program 110 may be FreeFlow™ Process Manager sold by Xerox, Inc. Although one embodiment of the node maintenance manager 130 may interface FreeFlow™ Process Manager, it should be readily apparent to those skilled in the art that other embodiments of the node maintenance manager 130 may interface with other commercial workflow programs.

The workflow program 110 may interface with an operating system 120. The operating system 120 may be configured to manage the software applications, data and respective hardware components (e.g., displays, disk drives, etc.) as well as providing a platform to execute the workflow program 110 and the node maintenance manager 130. The operating system 120 may be implemented by the MICROSOFT WINDOWS family of operating systems, UNIX, LINUX, and other similar operating systems.

The node maintenance manager 130 may be configured to interface with workflow program 110. In other embodiments, the node maintenance manager 130 may be configured to interface with the operating system 120 or a combination of operating system 120 and the workflow program 110. The node maintenance manager 130 may be further configured to manage associations between nodes based on either a master association or a peer-to-peer association. When a user designates a master association for a process node (e.g., a master node), the node maintenance manager 130 be configured to propagate any changes or edits to the designated slave/client nodes in response to saving the changes in the master process node based on the master relationship. When a user designates a peer-to-peer association for a group of nodes, any changes to a peer within a peer-to-peer association is propagated to the rest of the group by the node maintenance manager 130 in response to the save event.

It will be appreciated by those skilled in the art that various parts of the automated workflow described below might be implemented by reference to one of several references. For instance, U.S. Pat. No. 6,462,756 B1 to Hansen et al., the pertinent portions of which are incorporated herein by reference, discloses a system and method for managing production printing workflow. The system of the '756 Patent includes workflow management software for managing and facilitating the procedural stages of the workflow including job origination, job preparation, job submission and job fulfillment. Additionally, U.S. Pat. No. 7,092,963 B2 to Ryan et al., the pertinent portions of which are incorporated herein by reference, discloses a print production and finishing system for electronic management and control of a wide range of finishing processes characterized by input from multiple production operations and equipment that, depending upon the job, might be variably applied to work pieces that themselves are highly variable between different jobs.

Figure 3:
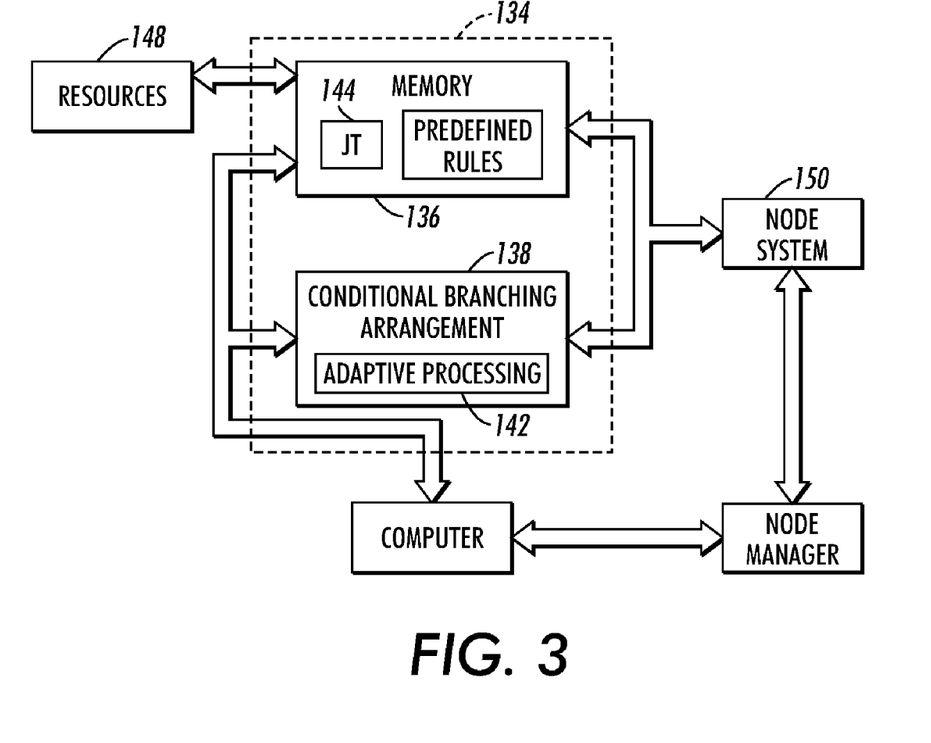
FIG. 3 is a block diagram of an automated print prepress workflow suited for use with at least some of the disclosed embodiments.

The following description relates to an improved workflow that combines several workflow subsystems into an integrated architecture providing a uniquely viable approach for enabling "lights out" production automation. Referring specifically to FIG. 3, an automated print prepress workflow is designated by the numeral 134. The workflow includes a memory 136 communicating with a conditional branching arrangement 138. The conditional branching arrangement 138 provides a mechanism by which the workflow can evaluate information at a selected time (such as runtime) to determine which path a specific job should take through the workflow. This can be achieved by evaluating job information (as gathered through a flexible job ticketing functionality—to be described below) using logical tests to determine the path that a corresponding job should take.

Figure 4:
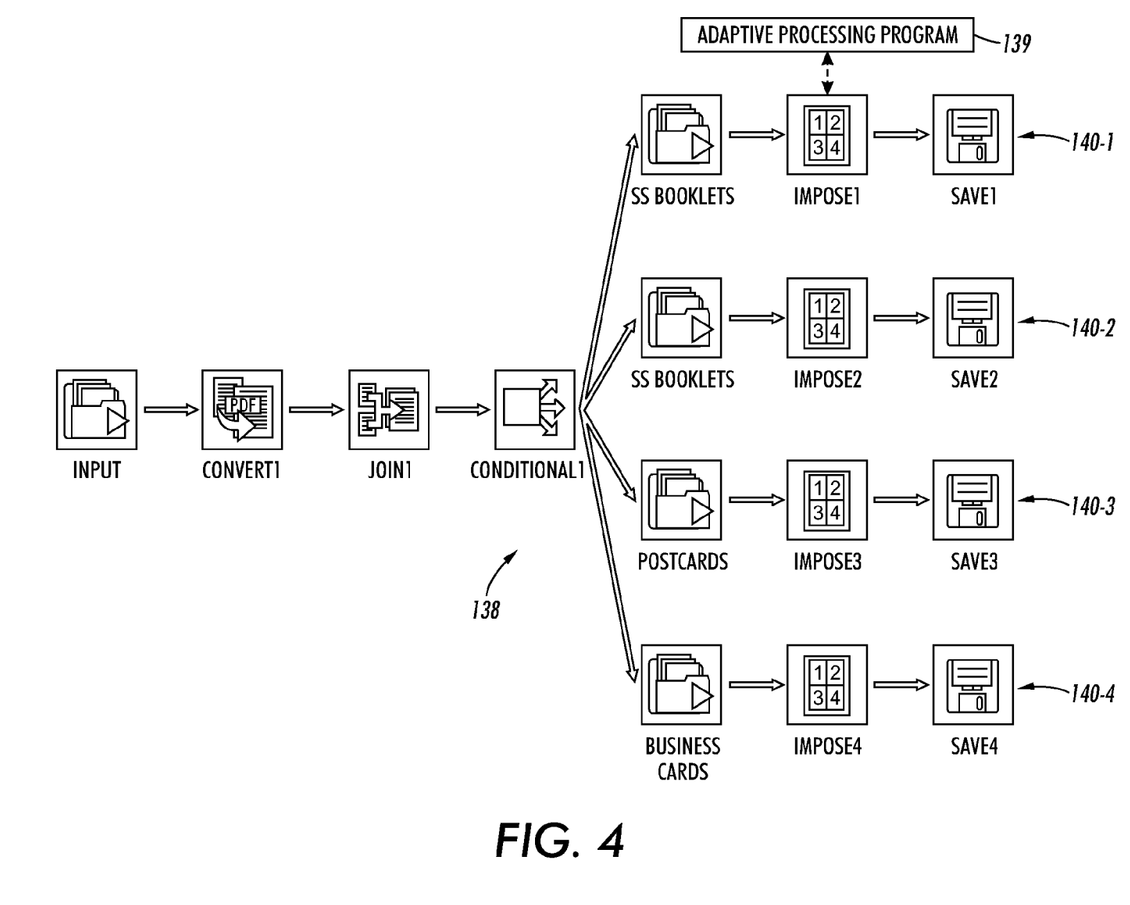
FIG. 4 is a schematic, block diagrammatic view of a conditional branching arrangement with an adaptive processing program.

Referring to FIG. 4, a simple exemplary conditional branching arrangement 138 is shown. In the example of FIG. 4, the conditional branching arrangement 138 accommodates for several different types of imposition approaches. That is, the arrangement possesses several print job prepress development paths 140-1 (140-1, 140-2 and so on). It will be appreciated that while imposition is shown as one "theme" of the print job prepress development paths, a variety of prepress operations types (such as finishing options) could be employed to configure a wide range of potential print job prepress development paths to which the workflow could automatically branch. Another working example of another conditional branching implementation is publicly available via Pitstop Automate. Despite the advantages provided by conditional branching, the inventor has found that conditional branching, when used without the improvements described below, has limited capacity to enable true automation.

The inventor has further found that greater levels of automation can be achieved through use of conditional branching in conjunction with "adaptive processing." Adaptive processing is a mechanism permitting a given individual prepress operation to modify its own behavior during execution based on evaluated variables (or parameters) and predefined rules. In one example, as shown in FIG. 4, an adaptive processing program 139 may be preprogrammed for a given one of the prepress operations in path 140-1. As will be understood by those skilled in the art, adaptive processing could be provided for most of the operations of conditional branching arrangement 138. One exemplary approach of adaptive processing has been implemented for the imposition alignment controls of Xerox's FreeFlow™ v.5.0.

Figure 5:
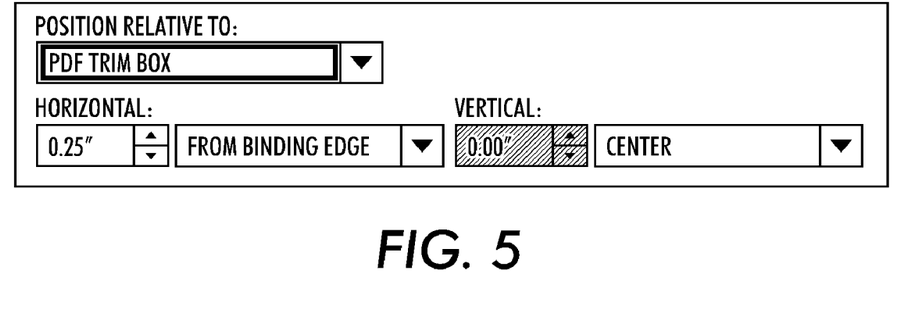
FIG. 5 is a user interface screen used for implementing some adaptive processing.

Referring to FIGS. 2-4, systems employing adaptive processing permit a system operator to preprogram rules that are executed against information evaluated at runtime. For example, when a system executes imposition using alignment rules, the system automatically determines the dimensions, coordinates and offsets of the predefined PDF area to be used for imposition (usually the trim-box). Referring specifically to FIG. 5, an example of a user interface screen suitable for setting an adaptive processing operation is shown. The system then looks at the overall sheet and the N-Up number to determine the area available for placement of each input page on the sheet. Once the system knows the area of the PDL to be imposed and the area into which the PDL will impose, the system looks up the alignment rules (e.g., center vertically and abut to spine with a 0.5" offset) and calculates the coordinates from which a given PDL page will be placed. The system then looks at the offset between the PDL dimensions and the PDL area to be used for imposition, and calculates the coordinates into which the input PDL should be placed. Any further specified offsets are calculated from the defined alignment origin. This process allows use of a single set of imposition parameters and rules to impose document with a wide variety of dimensions.

Although described in the context of imposition, adaptive processing can take many forms and can work with a large range of prepress operations. As contemplated herein, adaptive processing could, where appropriate, be implemented with any prepress operation of the disclosed automated workflow. Referring again to FIG. 3, an exemplary adaptive processing program used in conjunction with one of the operations of the conditional branching arrangement is designated with the numeral 138. While a workflow implemented with conditional branching and adaptive processing would go a far way toward promoting automated workflow of heterogeneous work, such workflow might still fall short of enabling prepress automation in which operator intervention was the exception rather than the rule. To reach that goal the automated workflow might desirably exploit a flexible job ticketing arrangement of the type described below.

Referring still to FIG. 3, a flexible job ticket mechanism ("JT") is designated with the numeral 144. This mechanism expands the notion of conventional job ticketing to include the extraction of parameters and information from resources 148, some of which resources are remotely disposed relative to the workflow 134, possibly disposed on a network. A partial definition of the term "resources" has been provided above, but as will be appreciated by those skilled in the art, a resource may include many types of structures and information other than that defined specifically or suggested above. For instance, a job ticket from a system remote to the workflow 134 could serve as a resource for JT 144. The job ticketing information might come from any one of a number of sources including, but not limited to:

Any number of typical job ticket files (e.g. XPIF, JDF);
Any number of atypical job ticket files (e.g. CSV, arbitrary XML);
Search Queries (e.g. SQL Queries, User-Defined Scripts);
Data gleaned from PDLs (e.g. XMP metadata in PDF, preflight results, Other PDF properties—e.g. dimensions, color spaces, Color Channels, etc.); and
Any other information available to the system (e.g. current date/time, file system path information, PDL names, etc.).

The automated platform 134 (FIG. 3) provides a user with the ability to specify an arbitrary mechanism for obtaining the information used to populate a single fully resolved job ticket. The system has default behaviors that can be customized for certain job tickets (e.g. JDF) and a precedence model to govern the creation of a resolved job ticket. Additionally, the system advantageously uses a wide variety of mechanisms for extracting information from a wide variety of sources via pre-selected rules. This rules-based extraction of job ticket information serves as a unique means of populating a source-independent job ticket that can then be used to drive the execution of process nodes (included in nodes 150 of FIG. 3) [e.g., Color Management, Preflight, Imposition, etc.) as well as conditional branching and adaptive processing. This allows the system to gather information from wherever it exists and whenever the information is available, and use that information to drive decision-making and process execution.

Unlike many known workflows, the proposed system would enable the use of multiple job ticket sources as input to a single, persistent job ticket that's used to drive execution and automated decision-making. The gathering of job ticket information and the use of that information would be independent from each other, thus enabling independent changes to either job ticket creation or workflow configuration. Since all relevant job processing information is stored in a location that's shared by all execution nodes, the system would similarly allow the user to define operations that modify job parameters used by other process nodes. For example:

Imposition may be defined as an operation that modifies print quantity (e.g., dividing print quantity by an N-Up value so the print nodes print the number of sheets that will produce the desired number of finished sets).

Finishing device selection may modify print parameters (e.g., print direction and face orientation may be defined by the selection of a finishing device configuration profile).

Another aspect of flexible job ticketing that is believed to be particularly useful involves the employment of the job parameters during execution. More specifically, the contemplated system permits use of any job parameters for any use. For example, print quantity may be nominally used to configure process nodes that submit a job for printing. The system could use print quantity to configure a print process node, and might use print quantity in other process nodes for other ends. For example, print quantity may be used:

to facilitate conditional branching,
in conjunction with PDL page counts to facilitate conditional branching,
in a barcode process node for print serialization, or
when constructing a job name pursuant to saving or submitting the job to print.

Essentially, the workflow or system could allow a user to specify use of any job parameter to populate any other job parameter. These operations could be pre-configured by the user with a simple UI, the UI including a predefined set of operations that would employ a recommended subset of job parameters (e.g., arithmetic operations would only use numeric job parameters).

Figure 6:
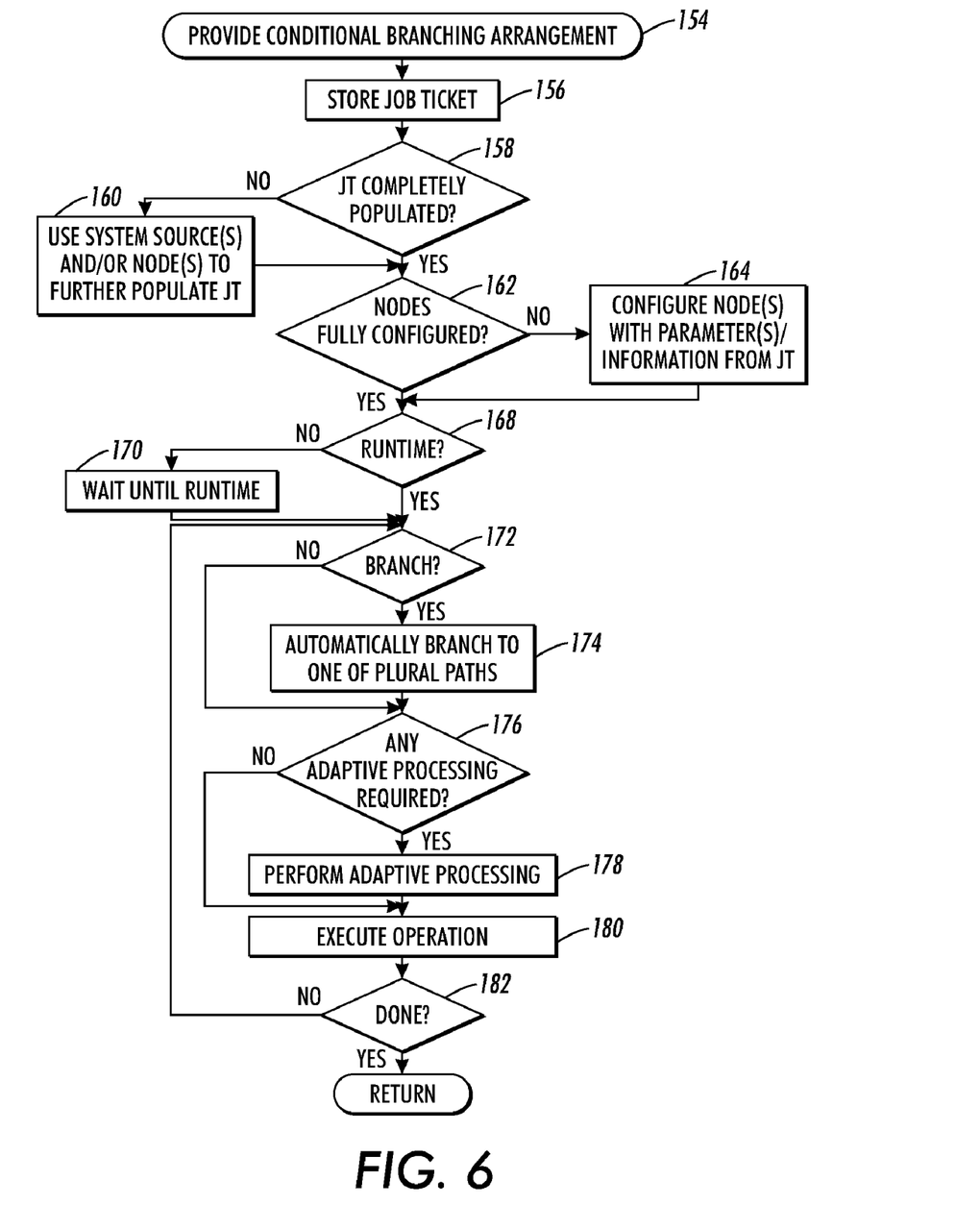
FIG. 6 is a flow diagram illustrating exemplary operation of the automated print prepress workflow of the disclosed embodiments.

Referring to FIG. 6, a process for automatically operating a prepress workflow in accordance with the disclosed embodiments is described. At 154, a conditional branching arrangement, of the type described above with respect to FIGS. 3 and 4 is developed or provided. In turn, at 156, a job ticket (such as the job ticket of 144 (FIG. 3)) is stored in memory 136 (FIG. 3). An inquiry at 158 is used to determine if the job ticket is completely populated. A partially populated job ticket can be further populated (via 160) with information from local or remote resources 148 (FIG. 3) and/or from nodes 150. It should be appreciated, based, in part, on the description above, that selected rules can be used to facilitate extraction of information from the resources 148. For instance, it might be desirable to provide a precedence model comparable to one used in a digital front end (DFE), such as a precedence model found in Xerox's DocuSP™. The presently suggested precedence model ("present model") would differ from a typical DFE precedence model in that the former would preferably be configurable (the DocuSP™ precedence model is pre-set). The present model could thereby be programmed to extract information in a select order. In one example, if the computer (FIG. 3) cannot find finish size in the PDL of an incoming job, then it might, in accordance with the select order, look to local and remote resources for the sake of setting such size. In another example, the computer might look to a customer request (outside of the job ticket) for determining the style of printing to be employed (possibly hard-bound versus paperback).

While a partially populated job ticket may become fully populated through use of 160, the approach of the disclosed embodiments does not necessarily require that such complete population occur prior to runtime since selected rules may be used to generate necessary job related information "on-the-fly." A further inquiry is made at 162 to determine if the nodes 150 have been fully configured. One feature of the disclosed process, as indicated by 164, is that information and/or parameters of the job ticket can be used, in conjunction with the node manager (FIG. 3), to configure one or more nodes.

Referring still to FIG. 6, a determination is made (at 168) to ascertain whether it is time to develop or execute the print job corresponding with the job ticket (i.e., whether it is "runtime")—if runtime has not been reached, then execution may be delayed (170). At runtime, the system determines (via 172) whether conditional branching is warranted. If the answer to inquiry 172 is positive, then automatic branching (174) occurs so that a first operation in one of a plurality of print job prepress development paths is selected (see, for example, FIG. 4). For each operation, a check (176) is performed to determine if adaptive processing or modification is required.

If adaptive processing has been programmed for the operation being executed, then adaptive processing is performed by way of 178. As discussed above, with respect to U.S. Patent Application Publication No. 20070201045 (published on Aug. 28, 2007), the pertinent portions of which are incorporated herein by reference, adaptive processing may advantageously exploit selected pre-programming rules. For instance, the rules can be particularly useful in dictating not only what parameters should be employed in a given adaptive process, but how information is to be processed with the parameters. Rules can also be useful in dictating how a particular operation is to be performed. For instance, in Xerox's automatic image enhancement approach, the manner in which one image is processed relative to another image can be controlled. In particular, for a given page with multiple image components, it might be desirable to enhance one image component without enhancing another image component.

One of the operations for a path is, at 180, executed, and a check (182) is performed to determine if the end of the path has been reached. If the end has been reached, then execution of the path is completed and the process returns; otherwise, the process loops back to 172 to complete execution of any unexecuted operations. As will be appreciated by those skilled in the art, the process of FIG. 6 comprehends suitable incrementing that causes successive execution (with possible associated adaptive processing) of each operation in a given workflow.

Based on the above description, the following features of the disclosed automated print prepress workflow should now be apparent:

The automated print prepress workflow takes advantage of automatic adaptive processing, the automatic adaptive processing being performed in accordance with one or more selected rules. Such performance may include applying the one or more selected rules in accordance an evaluation. The evaluation may be performed with a processor and one or both of (1) one or more of the plurality of print job related parameters and (2) at least part of the print job related information set.

In one example of operation, the processor may cause information, for use in a set of print job related information, to be extracted from a plurality of resources. The extraction may be performed in accordance with one or more selected rules.

In another example of operation, the automated print prepress workflow includes a plurality of nodes and one of a plurality of print job related parameters is used to configure one of the plurality of nodes. Additionally, one of the plurality of nodes may be used to change a subset of the set of print job related information.

The automated print prepress workflow makes advantageous use of a flexible job ticket. The flexible job ticket may include a first set of print job related information and, in one instance, a second set of print job related information is combined with the first set of print job related information to form a third set of print job related information.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for developing a print job, comprising:
   A. a processor;
   B. a print job workflow, communicating with said processor, the print job workflow defining a plurality of print job prepress development operations to be performed with respect to the print job, the plurality of print job prepress development operations being arranged in a print job prepress development path, wherein at least one of the print job prepress development operations is operatively associated with a parameter and programmed to perform adaptive processing with the parameter;
   C. a memory for storing a job ticket, the job ticket including a set of print job related information, said memory comprising one or more programming instructions that, when executed, instruct the processor to:
      (1) execute each prepress development operation in the print job prepress development path,
      (2) pursuant to said C(1), determining whether the print job prepress development operation to be executed comprises the at least one of the print job prepress development operations,
      (3) if the print job prepress development operation to be executed comprises the at least one of the print job prepress development operations, then adaptively using the parameter, along with a subset of the set of print job related information, to perform adaptive processing with respect to the at least one or the print job prepress development operations, and
      (4) if the print job prepress development operation to be executed does not comprise the at least one of the print job prepress development operations, then execute the print job prepress development operation to be executed without performing any adaptive processing.

2. The system of claim 1, wherein the at least one of the print job prepress development operations is programmed with one or more selected rules.

3. The system of claim 2, wherein said C(3) includes applying the one or more selected rules in accordance an evaluation.

4. The system of claim 1, wherein said processor causes information to be extracted from a plurality of separate resources to form at least a part of the print job related information set.

5. The system of claim 4, wherein said extraction is performed in accordance with one or more selected rules.

6. The system of claim 5, in which the job ticket a first set of print job related information, wherein a second set of print job related information is combined with the first set of print job related information to form a third set of print job related information.

7. An automated print prepress workflow for developing a print job for execution in a printing system at a selected job development time, comprising:

memory;
a processor communicating with said memory;
a job ticket stored in said memory, said job ticket including a plurality of print job related parameters and a set of print job related information;
a conditional branching arrangement communicating with said processor, said conditional branching arrangement defining a plurality of print job prepress development paths, each one of the plurality of print job prepress development paths including one or more print job prepress development operations;
wherein prepress development of the print job includes automatically branches to one of the plurality of print job prepress development paths, responsive to said processor reading one or both of the (1) the one or more of the plurality of print job related parameters and (2) at least part of the print job related information set, to execute each one of the one or more print job prepress development operations in the one of the plurality of print job prepress development paths; and
wherein, during execution of at least one of the one or more print job prepress development operations, said at least one of the one or more print job prepress development operations is automatically adaptively processed.

8. The automated print prepress workflow of claim 7, wherein said automatic adaptive processing is performed in accordance with one or more selected rules.

9. The automated print prepress workflow of claim 8, wherein said performance includes applying the one or more selected rules in accordance an evaluation.

10. The automated print prepress workflow of claim 9, wherein said evaluation is performed with the processor and at least one of the (1) one or more of the plurality of print job related parameters and (2) at least part of the print job related information set.

11. The automated print prepress workflow of claim 7, wherein said processor causes information to be extracted from a plurality of separate resources to form at least a part of the print job related information set.

12. The automated print prepress workflow of claim 11, wherein said extraction is performed in accordance with one or more selected rules.

13. The automated print prepress workflow of claim 7, in which said automated print prepress workflow includes a plurality of nodes, wherein one of the plurality of print job related parameters is used to configure one of the plurality of nodes.

14. The automated print prepress workflow of claim 7, in which said automated print prepress workflow includes a plurality of nodes, wherein one of the plurality of nodes is used to change or create a subset of the set of print job related information.

15. The automated print prepress workflow of claim 7, in which the job ticket includes a first set of print job related information, wherein a second set of print job related information is combined with the first set of print job related information to form a third set of print job related information.

16. A method for developing a print job, comprising:
A. storing a job ticket in memory, the job ticket including a set of print job related information;
B. instructing or causing a processor to perform the following:
(1) execute each prepress development operation in a plurality of print job prepress development operations, the plurality of print job prepress development operations being arranged in a print job prepress development path, wherein at least one of the print job prepress development operations is operatively associated with a parameter and programmed to perform adaptive processing with the parameter,
(2) pursuant to said B(1), determining whether the print job prepress development operation to be executed comprises the at least one of the print job prepress development operations,
(3) if the print job prepress development operation to be executed comprises the at least one of the print job prepress development operations, then adaptively using the parameter, along with a subset of the set of print job related information, to perform adaptive processing with respect to the at least one of the print job prepress development operations, and
(4) if the print job prepress development operation to be executed does not comprise the at least one of the print job prepress development operations, then execute the print job prepress development operation to be executed without performing any adaptive processing.

17. The method of claim 16, further comprising programming at least one of the print job prepress development operations with one or more selected rules.

18. The method of claim 16, further comprising using the processor to cause information to be extracted from a plurality of separate resources to form at least a part of the print job related information set.

19. The method of claim 16, in which the job ticket includes a first set of print job related information, further comprising combining the first set of print job related information with a second set of print job related information to form a third set of print job related information.

20. A method for developing a print job for execution in a printing system at a selected runtime, comprising:
A. storing a job ticket in memory, the job ticket including a plurality of print job related parameters and a set of print job related information;
B. automatically branching to one of a plurality of print job prepress development paths, each one of the plurality of print job prepress development paths including one or more print job prepress development operations, said automatic branching being responsive to said processor reading one or both of the (1) the one or more of the plurality of print job related parameters and (2) at least part of the print job related information set;
C. executing each one of the one or more print job prepress development operations in the one of the plurality of print job prepress development paths; and
D. pursuant to executing at least one of the one or more print job prepress development operations, automatically adaptively processing the at least one of the one or more print job prepress development operations.

21. The method of claim 20, wherein said D is performed in accordance with one or more selected rules.

22. The method of claim 20, further comprising extracting information from a plurality of separate resources to form at least a part of the print job related information set.

23. The method of claim 20, further comprising configuring one of a plurality of nodes with one of the plurality of print job related parameters.

* * * * *